United States Patent
Zheng et al.

(10) Patent No.: US 11,565,241 B2
(45) Date of Patent: Jan. 31, 2023

(54) METHOD FOR IN-SITU GENERATION OF NANOFLOWER-LIKE MANGANESE DIOXIDE CATALYST ON FILTER MATERIAL

(71) Applicant: FUZHOU UNIVERSITY, Fujian (CN)

(72) Inventors: Yuying Zheng, Fuzhou (CN); Jian Chen, Fujian (CN)

(73) Assignee: FUZHOU UNIVERSITY, Fuzhou (CN)

( * ) Notice: Subject to any disclaimer, the term of this patent is extended or adjusted under 35 U.S.C. 154(b) by 1037 days.

(21) Appl. No.: 16/322,133

(22) PCT Filed: Sep. 12, 2016

(86) PCT No.: PCT/CN2016/111417
§ 371 (c)(1),
(2) Date: Jan. 31, 2019

(87) PCT Pub. No.: WO2018/045672
PCT Pub. Date: Mar. 15, 2018

(65) Prior Publication Data
US 2020/0179906 A1 Jun. 11, 2020

(30) Foreign Application Priority Data
Sep. 12, 2016 (CN) .......................... 201610814875.4

(51) Int. Cl.
*B01J 23/24* (2006.01)
*B01J 23/34* (2006.01)
(Continued)

(52) U.S. Cl.
CPC .............. *B01J 23/34* (2013.01); *B01D 46/02* (2013.01); *B01D 53/8628* (2013.01);
(Continued)

(58) Field of Classification Search
None
See application file for complete search history.

(56) References Cited

FOREIGN PATENT DOCUMENTS

| CN | 102120116 A | 7/2011 |
|----|-------------|--------|
| CN | 103949115 A | 7/2014 |

(Continued)

OTHER PUBLICATIONS

Zheng et al., MnO2 catalysts uniformly decorated on polyphenylene sulfide filter felt by a polypyrrole-assisted method for use in the selective catalytic reduction of NO with NH3, RSC Adv., 2014, 4, 59242 (Year: 2014).*

(Continued)

*Primary Examiner* — Coris Fung
*Assistant Examiner* — Keling Zhang
(74) *Attorney, Agent, or Firm* — Bayramoglu Law Offices LLC

(57) ABSTRACT

A method for in-situ generation of nanoflower-like manganese dioxide catalyst on filter material is provided. The method comprises: immersing a filter material in a solution containing sodium lauryl sulfate and nitric acid; first modifying the surface of the filter material by using the sodium lauryl sulfate so that a charge layer is wound around the surface of the filter material and tightly absorbs $H^+$ in an acid solution; and then adding potassium permanganate as an oxidant to react with $H^{3O}$ on the surface of the filter material to generate nano flower-like manganese dioxide in situ on the surface of the filter material, so as to obtain a composite filter material having a denitration function.

1 Claim, 3 Drawing Sheets

(51) Int. Cl.
  *B01D 46/02* (2006.01)
  *B01D 53/86* (2006.01)
  *B01J 20/26* (2006.01)
  *B01J 20/28* (2006.01)
  *B01J 20/32* (2006.01)
  *B01J 35/00* (2006.01)
  *B01J 35/06* (2006.01)
  *B01J 37/02* (2006.01)
  *B01J 37/06* (2006.01)
  *B01J 37/34* (2006.01)

(52) U.S. Cl.
  CPC ....... *B01J 20/262* (2013.01); *B01J 20/28028* (2013.01); *B01J 20/3212* (2013.01); *B01J 20/3225* (2013.01); *B01J 20/3236* (2013.01); *B01J 20/3293* (2013.01); *B01J 35/0013* (2013.01); *B01J 35/06* (2013.01); *B01J 37/0203* (2013.01); *B01J 37/0207* (2013.01); *B01J 37/0236* (2013.01); *B01J 37/06* (2013.01); *B01J 37/343* (2013.01); *B01D 2255/2073* (2013.01)

(56) References Cited

FOREIGN PATENT DOCUMENTS

CN   105521659 A   4/2016
CN   106215522 A   12/2016

OTHER PUBLICATIONS

Sun et al., One-pot synthesis of ultrathin manganese dioxide nanosheets and their efficient oxidative degradation of Rhodamine B, Applied Surface Science, 2015, 357, 69-73 (Year: 2015).*

Vijayendran et al., Polymer polarity and surfactant adsorption, Journal of Applied Polymer Science, 1979, 23, 733-742 (Year: 1979).*

Sai et al., https://www.researchgate.net/post/What_is_the_difference_between_air_oven_drying_and_vacuum_oven_drying (Year: 2015) (Year: 2015).*

Hu et al., Symmetrical MnO2-carbon nanotube-textile nanostructures for wearable pseudocapacitors with high mass loading, ACSNano, 2011, 5, 11, 8904-8913 (Year: 2011).*

Qing et al., Research on de-NO by low-temperature SCR based on MnOx-CeO2/PPSN, J. Fuel Chem. Technol., 2012, 452-455 (Year: 2012).*

\* cited by examiner

METHOD FOR IN-SITU GENERATION OF NANOFLOWER-LIKE MANGANESE DIOXIDE CATALYST ON FILTER MATERIAL

CROSS REFERENCE TO RELATED APPLICATIONS

This application is the national phase entry of International Application No. PCT/CN2016/111417, filed on Dec. 22, 2016, which is based upon and claims priority to Chinese Application No. CN 201610814875.4, filed on Sep. 1, 2016, the entire contents of which are incorporated herein by reference.

FIELD AND BACKGROUND OF THE INVENTION

The present invention belongs to the technical field of functional filter materials, and in particular relates to a method for in-situ generation of nanoflower-like manganese dioxide catalyst on filter material.

China is in the stage of rapid economic development, and the demand for energy is very large, especially the demand for electricity is increasing. China's coal-based energy structure determines that China's electric power is mainly based on thermal power generation, and most of the power plants are coal-fired power plants. In addition to ensuring rapid economic development, coal-fired power plants will generate a large amount of pollutants such as dust, sulfur dioxide and NOx toxic gases. At present, filter-bag dust collectors are mainly used in industry to control a large amount of dust and trace particles generated by coal-fired power station boilers, the core of the filter-bag dust collector is filter material. Polyphenylene sulfide filter material (PPS filter material) has become the first choice for filter bags of coal-fired power plants because of its stable chemical structure, acid and alkali corrosion resistance, hydrolysis resistance, dimensional stability, and the like.

However, there is no effective control method for the filter bag dust collector to discharge nitrogen oxides from industrial exhaust gas. Therefore, researching a composite functional filter material having both dust removal and denitration functions has become a hot spot for many researchers. Chinese patent application No. CN 103949115 A discloses a method for in-situ generation of nanoflower-like manganese dioxide catalyst on filter material, where the surface of the filter material is uniformly coated with a layer of polydopamine by oxidation self-polymerization of dopamine, and then by virtue of chelation of the polydopamine layer with divalent manganese ions, a denitration catalyst is generated in situ on the surface of the polydopamine-coated filter material fiber in the presence of potassium permanganate serving as an oxidant to prepare a composite filter material having a denitration function. However, its disadvantage is that the surface of the filter material is modified by using dopamine, and the uniformly coated polydopamine layer affects the gas permeability of the filter material, thereby affecting its dust removal function; and the preparation process is complicated.

On the other hand, if the denitration catalyst is directly attached to the filter fiber, such disadvantages that the catalyst load is uneven, the gas permeability is poor, the low temperature activity is poor, and the binding force between the catalyst and the filter fiber is weak are caused. Therefore, it is very important to study a composite filter material capable of uniformly and firmly supporting a denitration catalyst and having excellent low-temperature activity.

SUMMARY OF THE INVENTION

The present invention is directed to the disadvantages of the prior art and provides a method for in-situ generation of nanoflower-like manganese dioxide catalyst on filter material. The filter material prepared by the present invention has excellent low-temperature activity, and has an excellent denitration rate, the NOx removal efficiency reach 97% at 160° C., and the composite filter material has excellent bonding strength, gas permeability and catalytic stability.

In order to achieve the above object, the present invention adopts the following technical solution:

Method for in-situ generation of nanoflower-like manganese dioxide catalyst on filter material, comprising the steps of: immersing a filter material in a solution containing sodium lauryl sulfate and nitric acid; first modifying the surface of the filter material by using the sodium lauryl sulfate so that a charge layer is wound around the surface of the filter material and sufficiently absorbs $H^+$ in the solution; and then adding potassium permanganate to the solution to react with $H^+$ on the surface of the filter material to generate nano flower-like manganese dioxide in situ on the surface of the filter material, so as to obtain a composite filter material having a denitration function.

The concentration of sodium lauryl sulfate is 0.1-2 g/L and the concentration of nitric acid is 0.01-0.2 M in the solution described above.

The filter material described above is a polyphenylene sulfide needle felt filter material.

The method described above specifically comprises the following preparation steps:

1) immersing a filter material in a solution containing sodium lauryl sulfate and nitric acid, and ultrasonically dispersing for 1 h so that sodium lauryl sulfate is sufficiently adsorbed on the surface of the filter material;

2) after the reaction system of step 1) is heated to 60-80° C., adding potassium permanganate and further stirring for reaction for 0.5-2 h so that the potassium permanganate reacts with H+ on the surface of the filter material to generate nano flower-like manganese oxide in situ; and 3) rinsing the filter material obtained in Step 2) with deionized water and ethanol, and drying in a vacuum oven at 110° C. for 6 h to obtain a composite filter material having a denitration function.

In Step 2), the concentration of potassium permanganate in the reaction system is 0.01-0.2M.

The nano flower-like manganese dioxide catalyst generated on the filter material in situ is prepared by the following chemical equation:

$$4MnO_4^- + 4H^+ \rightarrow 4MnO_2 + 3O_2 + 2H_2O.$$

A composite filter material with a denitration function, prepared by the above method, can be used for simultaneous removal of PM2.5 and NOx, and has an excellent denitration rate. The NOx removal efficiency reach 97% at 160° C.

Compared with the prior art, the present invention has the following beneficial effects:

(1) According to the present invention, sodium lauryl sulfate is used to modify the surface of the filter material, which does not affect the surface of the filter material, and does not affect the gas permeability (see FIG. 1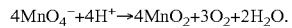); since the surface of the filter fiber is uniformly coated with a layer of nanoflower-like manganese dioxide, the manganese dioxide of such a morphology has a larger specific surface area and a higher pore volume than ordinary manganese dioxide, and is more conducive to the diffusion of the reaction gas, and therefore the catalytic filter material has very excellent low-temperature activity; the NOx removal efficiency reach 97% at 160° C.; the composite filter material has excellent bonding strength, gas permeability and catalytic stability.

(2) The preparation method is simple and environmentally friendly; reagents used in the experiment are cheap and readily available, and the experimental process is easy to operate, and the reaction process takes only 2-3 hours; therefore, the method is advantageous for large-scale experimental production.

DESCRIPTION OF THE PREFERRED EMBODIMENTS

Figure 1:
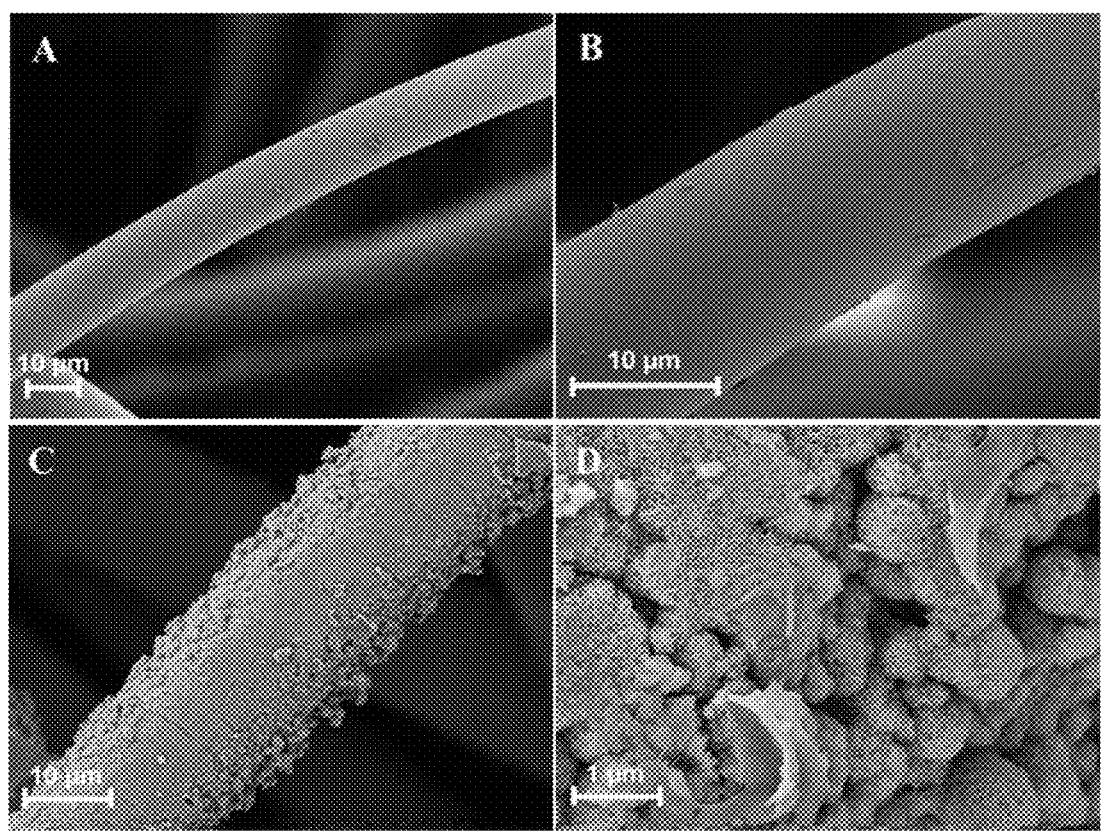
FIG. 1 shows SEM diagrams of raw polyphenylene sulfide needle felt filter materials (A, B) and polyphenylene sulfide composite filter materials with a denitration function (C, D)
Figure 2:
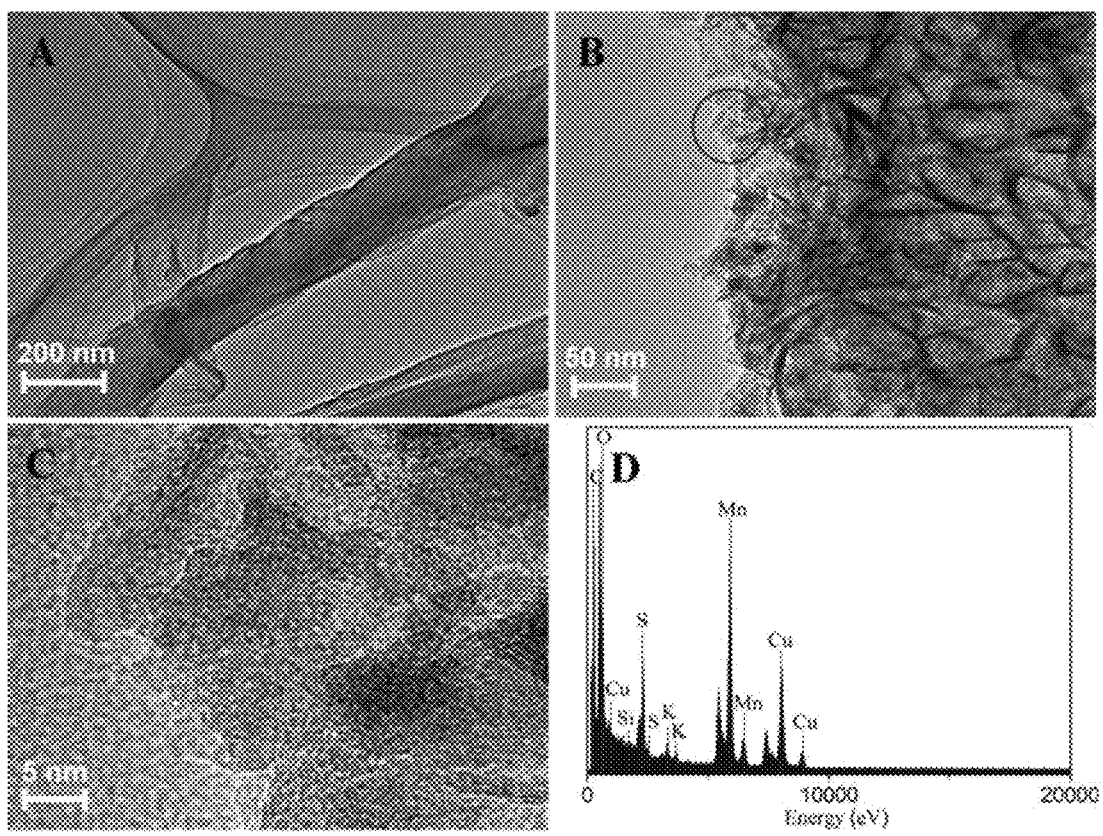
FIG. 2 shows TEM diagrams of a raw polyphenylene sulfide needle felt filter material (A) and polyphenylene sulfide composite filter materials with a denitration function (B, C), and an EDX diagram (D) of a polyphenylene sulfide composite filter material with a denitration function.
Figure 3:
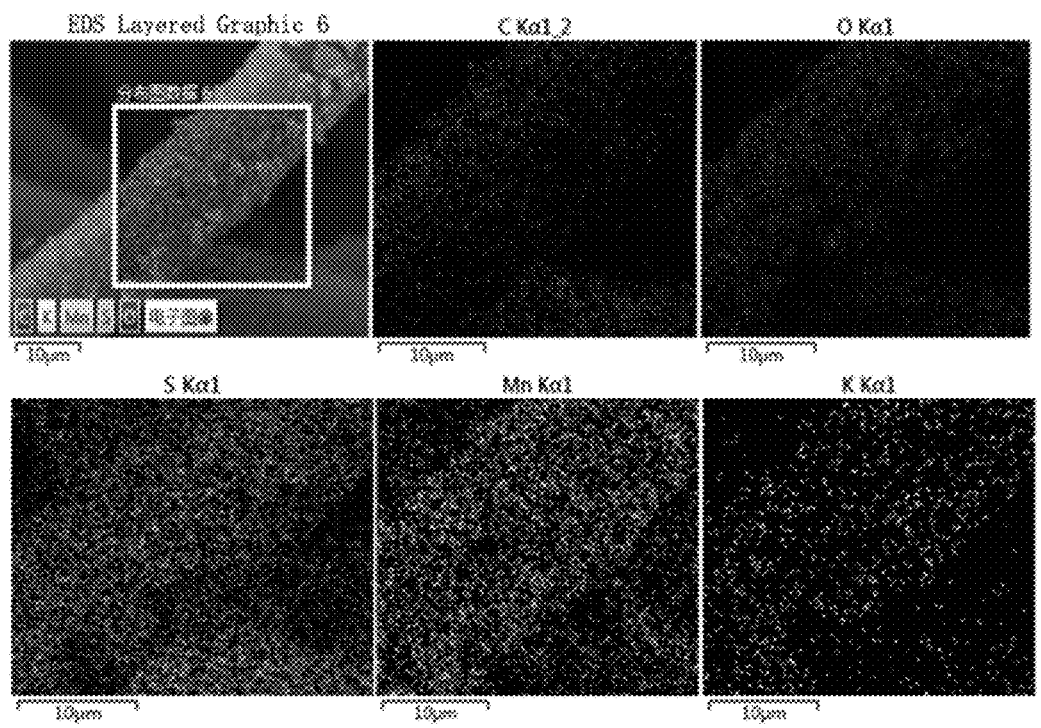
FIG. 3 shows analysis of the surface element composition of a polyphenylene sulfide composite filter fiber with a denitration function.
Figure 4:
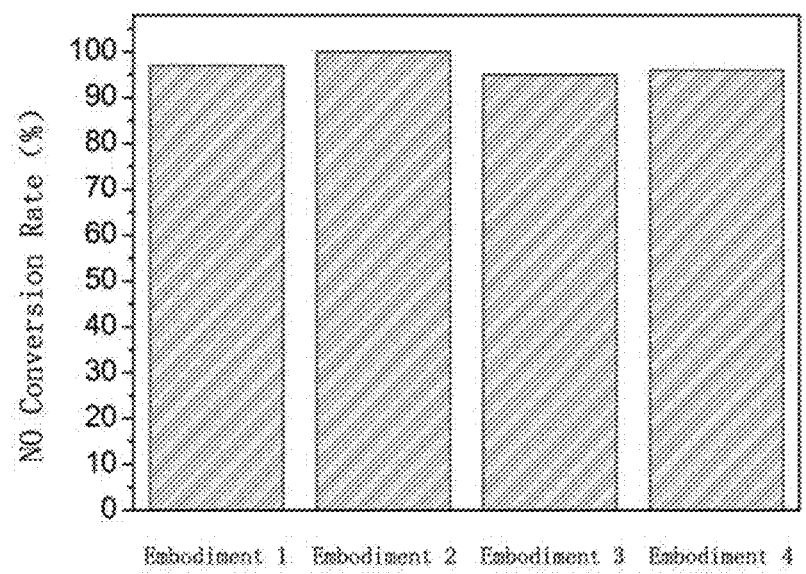
FIG. 4 is a diagram showing the NO conversion rate of the polyphenylene sulfide composite filter having a denitration function at 160° C.
Figure 5:
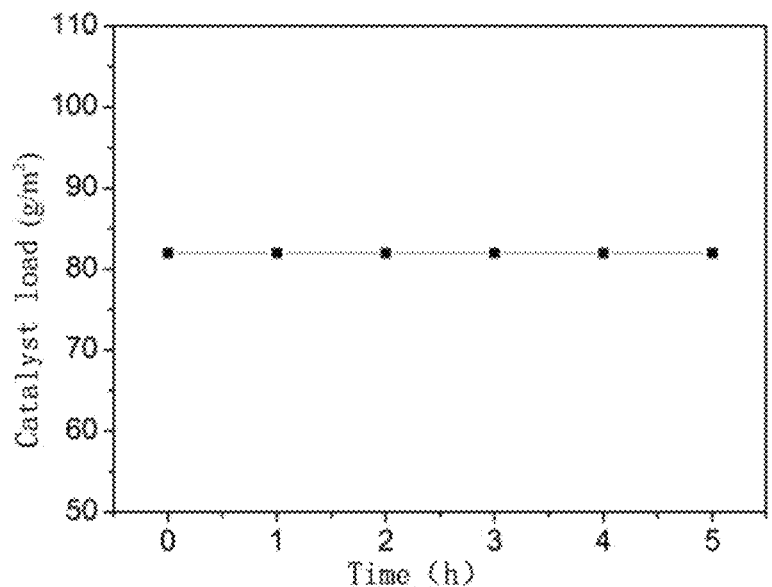
FIG. 5 shows the bonding strength of the polyphenylene sulfide composite filter with a denitration function.
Figure 6:
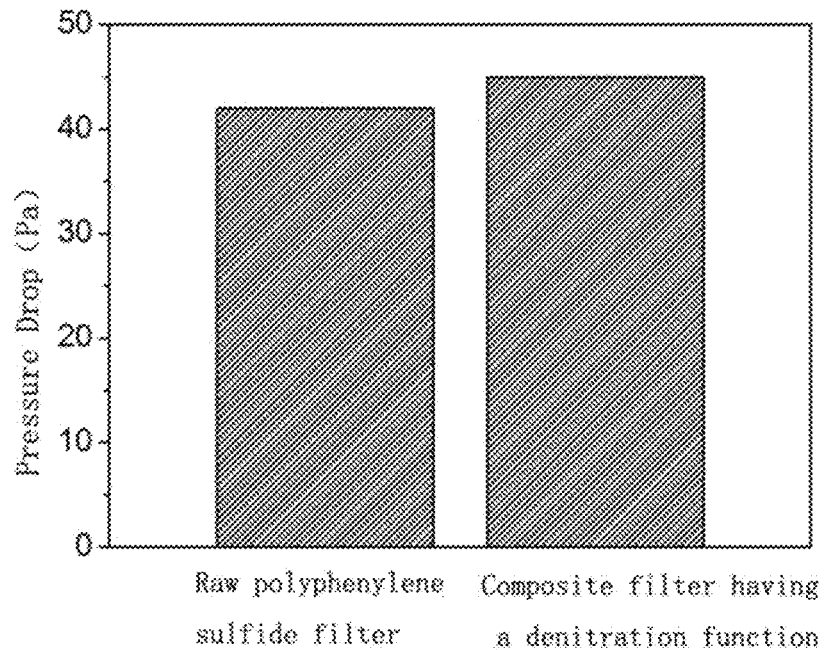
FIG. 6 shows the gas permeability of the raw polyphenylene sulfide needle felt filter material and the polyphenylene sulfide composite filter material with a denitration function.

In order to make the objects, technical solutions, and advantages of the present invention more comprehensible, the present invention will be further described in detail below in conjunction with the embodiments. It should be understood that specific embodiments described here are merely illustrative of the present invention rather than limiting it. The application principle of the present invention will be further described below in conjunction with the accompanying drawings and specific embodiments.

Embodiment 1

Method for in-situ generation of nanoflower-like manganese dioxide catalyst on filter material, comprising the following steps:

a) adding 0.042 g of sodium dodecyl sulfate solid particles and a trace of concentrated nitric acid to deionized water, stirring and dissolving to prepare a sodium dodecyl sulfate solution with a concentration of 0.84 g/L, wherein the concentration of nitric acid is controlled to be 0.05M;

b) immersing a circular polyphenylene sulfide filter material having a diameter of 3.8 cm into the suspension solution of step a), ultrasonically dispersing in an ultrasonic cleaner for 1 h, so that sodium lauryl sulfate is sufficiently adsorbed on the surface of the filter material;

c) heating the reaction system to 70° C., adding a potassium permanganate solution dropwise with a concentration of 0.05M and further stirring for reaction for 1.5 h so that the potassium permanganate reacts with $H^{30}$ on the surface of the filter material to generate nano flower-like manganese oxide in situ; and d) rinsing the filter material obtained in Step c) with deionized water and ethanol, and drying in a vacuum oven at 110° C. for 6 h to obtain a composite filter material having a denitration function.

The denitration performance of the composite filter material is evaluated in a self-made tubular SCR reactor. Test conditions: $[NO]=[NH_3]=400$ ppm, $[O_2]=5\%$, $N_2$ is equilibrium gas, the gas flow rate is 700 mL*min$^{-1}$, the temperature is set to 160° C., and the denitration efficiency measured with a British KM940 flue gas analyzer is 97%.

Embodiment 2

Method for in-situ generation of nanoflower-like manganese dioxide catalyst on filter material, comprising the following steps:

a) adding 0.024 g of sodium dodecyl sulfate solid particles and a trace of concentrated nitric acid to deionized water, stirring and dissolving to prepare a sodium dodecyl sulfate solution with a concentration of 0.48 g/L, wherein the concentration of nitric acid is controlled to be 0.1 M;

b) immersing a circular polyphenylene sulfide filter material having a diameter of 3.8 cm into the suspension solution of step a), ultrasonically dispersing in an ultrasonic cleaner for 1 h, so that sodium lauryl sulfate is sufficiently adsorbed on the surface of the filter material;

c) heating the reaction system to 80° C., adding a potassium permanganate solution dropwise with a concentration of 0.1M and further stirring for reaction for 2 h so that the potassium permanganate reacts with $H^+$ on the surface of the filter material to generate nano flower-like manganese oxide in situ; and d) rinsing the filter material obtained in Step c) with deionized water and ethanol, and drying in a vacuum oven at 110° C. for 6 h to obtain a composite filter material having a denitration function.

The denitration performance of the composite filter material is evaluated in a self-made tubular SCR reactor. Test conditions: $[NO]=[NH_3]=400$ ppm, $[O_2]=5\%$, $N_2$ is equilibrium gas, the gas flow rate is 700 mL·min$^{-1}$, the temperature is set to 160° C., and the denitration efficiency measured with a British KM940 flue gas analyzer is 100%.

Embodiment 3

Method for in-situ generation of nanoflower-like manganese dioxide catalyst on filter material, comprising the following steps:

a) adding 0.042 g of sodium dodecyl sulfate solid particles and a trace of concentrated nitric acid to deionized water, stirring and dissolving to prepare a sodium dodecyl sulfate solution with a concentration of 0.84 g/L, wherein the concentration of nitric acid is controlled to be 0.02M;

b) immersing a circular polyphenylene sulfide filter material having a diameter of 3.8 cm into the suspension solution of step a), ultrasonically dispersing in an ultrasonic cleaner for 1 h, so that sodium lauryl sulfate is sufficiently adsorbed on the surface of the filter material;

c) heating the reaction system to 65° C., adding a potassium permanganate solution dropwise with a concentration of 0.02M and further stirring for reaction for 1.5 h so that the potassium permanganate reacts with $H^+$ on the surface of the filter material to generate nano flower-like manganese oxide in situ; and d) rinsing the filter material obtained in Step c) with deionized water and ethanol, and drying in a vacuum oven at 110° C. for 6 h to obtain a composite filter material having a denitration function.

The denitration performance of the composite filter material is evaluated in a self-made tubular SCR reactor. Test conditions: [NO]=[$NH_3$]=400 ppm, [$O_2$]=5%, $N_2$ is equilibrium gas, the gas flow rate is 700 mL·min-1, the temperature is set to 160° C., and the denitration efficiency measured with a British KM940 flue gas analyzer is 95%.

Embodiment 4

Method for in-situ generation of nanoflower-like manganese dioxide catalyst on filter material, comprising the following steps:

a) adding 0.042 g of sodium dodecyl sulfate solid particles and a trace of concentrated nitric acid to deionized water, stirring and dissolving to prepare a sodium dodecyl sulfate solution with a concentration of 0.84 g/L, wherein the concentration of nitric acid is controlled to be 0.05M;

b) immersing a circular polyphenylene sulfide filter material having a diameter of 3.8 cm into the suspension solution of step a), ultrasonically dispersing in an ultrasonic cleaner for 1 h, so that sodium lauryl sulfate is sufficiently adsorbed on the surface of the filter material;

c) heating the reaction system to 65° C., adding a potassium permanganate solution dropwise with a concentration of 0.05M and further stirring for reaction for 2.5 h so that the potassium permanganate reacts with $H^+$ on the surface of the filter material to generate nano flower-like manganese oxide in situ; and d) rinsing the filter material obtained in Step c) with deionized water and ethanol, and drying it in a vacuum oven at 110° C. for 6 h to obtain a composite filter material having a denitration function.

The denitration performance of the composite filter material is evaluated in a self-made tubular SCR reactor. Test conditions: [NO]=[$NH_3$]=400 ppm, [Oz]=5%, $N_2$ is equilibrium gas, the gas flow rate is 700 mL·min$^{-1}$, the temperature is set to 160° C., and the denitration efficiency measured with a British KM940 flue gas analyzer is 96%.

The embodiments mentioned above are merely preferred embodiments of the present invention and not intended to limit the present invention. Any of modifications, equivalent substitutions, improvements, etc., made within the spirit and principle of the present invention shall be covered in the protection scope of the present invention.

What is claimed is:

1. A method for in-situ generation of a nanoflower shaped manganese dioxide catalyst on a filter material, comprising the steps of: immersing the filter material in a solution containing sodium lauryl sulfate and nitric acid; first modifying a surface of the filter material through the sodium lauryl sulfate in the solution so that a charge layer is wound around the surface of the filter material and the surface of the filter material sufficiently absorbs $H^+$ in the solution; and then adding potassium permanganate to the solution to react with $H^{3O}$ on the surface of the filter material to generate the nanoflower shaped manganese dioxide in-situ on the surface of the filter material, so as to obtain a composite filter material having a denitration function;

wherein a concentration of the sodium lauryl sulfate is 0.1-2 g/L and a concentration of the nitric acid is 0.01-0.2 M in the solution;

wherein the filter material is a polyphenylene sulfide needle felt filter material;

the method comprising the following preparation steps:

1) immersing the filter material in the solution containing the sodium lauryl sulfate and the nitric acid, and dispersing for 1h by using ultrasonic waves so that the sodium lauryl sulfate is sufficiently adsorbed on the surface of the filter material;

2) after the solution of step 1) is heated to 60-80° C., adding the potassium permanganate and further stirring for reaction for 0.5-2 h so that the potassium permanganate reacts with the $H^{3O}$ on the surface of the filter material to generate the nanoflower shaped manganese oxide in-situ; and 3) rinsing the filter material obtained in step 2) with deionized water and ethanol, and drying it in a vacuum oven at 110° C. for 6 h to obtain a composite filter material with a denitration function;

wherein a concentration of the potassium permanganate in step 2) is 0.01-0.2M.

* * * * *